United States Patent [19]

Giras

[11] 3,932,735
[45] Jan. 13, 1976

[54] METHOD OF CONTROLLING SUPPLY OF POWER

[75] Inventor: Theodore C. Giras, Pittsburgh, Pa.

[73] Assignee: Westinghouse Electric Corporation, Pittsburgh, Pa.

[22] Filed: Feb. 3, 1972

[21] Appl. No.: 223,378

Related U.S. Application Data

[63] Continuation of Ser. No. 66,591, Aug. 24, 1970, abandoned, which is a continuation of Ser. No. 722,805, April 19, 1968, abandoned, which is a continuation of Ser. No. 425,588, Jan. 14, 1965, abandoned.

[52] U.S. Cl.............................. 235/151.21; 444/1
[51] Int. Cl...... G06f 15/06; G06f 15/56; H02j 3/06
[58] Field of Search..................... 235/151.21; 444/1

[56] References Cited
UNITED STATES PATENTS

| | | | |
|---|---|---|---|
| 3,525,857 | 8/1970 | Davis et al. | 235/151.21 |
| 3,629,562 | 12/1971 | Davis | 235/151.21 |
| 3,683,161 | 8/1972 | Stadlin et al. | 235/151.21 |

Primary Examiner—Malcolm A. Morrison
Assistant Examiner—Edward J. Wise
Attorney, Agent, or Firm—E. F. Possessky

[57] ABSTRACT

A digital computer system is employed to produce power system control. The computer system employs an economic dispatch program, a unit selection program and a tie line interchange program to determine off line a tie line schedule and unit commitments needed to satisfy economically and safely a load forecast over a selected time interval such as 24 hours. In on line closed control loop operation, the computer system employs a load and frequency control program which uses the tie line schedule and other quantities in determining area control error. The control program develops a system error representation which reflects a smoothed present and anticipated area control error. The system error representation is distributed into individual generator plant control signals under economic dispatch program and unit selection program control and under constraint of programmed plant limits to assure that each generation move is error correcting as well as optimally economic.

67 Claims, 2 Drawing Figures

METHOD OF CONTROLLING SUPPLY OF POWER

This is a continuation of application Ser. No. 066,591, filed Aug. 24, 1970, which is a continuation of copending application Ser. No. 722,805, filed Apr. 19, 1968, which in turn is a continuation of copending application Ser. No. 425,588, filed Jan. 14, 1965, all now abandoned.

This invention relates to the power-supply art and has particular relationship to the control of an electric-power complex or system in which electric-power is generated, transmitted and consumed and which includes a plurality of power generating stations or units and tie lines to neighboring generating stations.

A power complex operates to deliver and consume huge quantities of power, the value of which per unit time, for example per day or per month is very large. A saving of even 1% or of a fraction of 1% in the cost of operation of such a complex may constitute a very large saving in terms of dollars. For example, the value of the power delivered by a typical complex may be as high as $30,000,000 per year. A savings of only 1% by reason of economy of operation would amount to $300,000 for this complex. Economy is then a prime consideration in the operation of electric-power system. It is an object of this invention to provide a method of controlling such an electric-power network or system so that it effectively and economically accommodates the instantaneous, i.e. short term load demands, while affording control action to correct for the sustained, i.e., long term load demands of its loads, thereby preserving system security and assuring availability of adequate spinning reserve for contingencies.

In attempting to attain this object the generating units of the system are controlled responsive to commands derived from changing load conditions. The principal parameters which are relied upon to derive these commands are the frequency at which the system operates and the flow of power over tie lines. These parameters are readily determined and they can be used to present an effective evaluation of the operation of the system. The frequency of the power of any power system is the same throughout the system and may be measured at any convenient point in the system. Any power system or network has a limited number of tie lines and the power flow in or out of the tie lines can be measured by a limited number of telemetering facilities. In practice, both the frequency and the tieline power flow are referred to a reference. The frequency reference in the United States is usually 60 cycles per second. The tie-line power flow may be selected at any desired magnitudes for the system, depending on the economics of absorbing power from, a supplying power to, neighboring networks.

With these specific desiderata in mind, it is an object of this invention to control economically an electric-power system so that the tie-line power flow commitments are met and the frequency is maintained as nearly as practicable at a constant magnitude such as 60 cycles per second.

Changing load demands of an electric-power system are met by changing the operation of any or all of the generating units of the system or by changing the tie-line flow, responsive to commands supplied to the generating units of the system. The costs of power generation in meeting changing load demands is a function of the manner in which the operation of the system is changed in response to the commands. The transmission of the commands may be described as dispatching and as this dispatching is carried out to minimize cost, it is called economic dispatching.

The cost of supplying power in any system is ordinarily different for different generating stations depending, for example, on the cost of fuel, the availability of water in a hydro-electric system, the time interval over which any change in the level of power supplied must take place, and on other factors. It is also dependent on the power-delivery, or output, level, at which a station is operating when a command to change power delivery arrives. It has been demonstrated that a power complex operates most efficiently at the point at which the incremental cost of delivering power from each of the generators is equal to the incremental cost for the others.

The achievement of economic control of a power complex so that it effectively supplies its loads requires that the power complex be connected in a regulation loop in which the power stations are controlled in accordance with the demands of the system. In accordance with the teachings of the earlier prior art, an analog computer was interposed in this loop. The computer received in its input the scheduled and actual load demand data and transmitted regulating commands to the generating units responsive to its input signals. Later, hybrid systems were proposed. In these hybrid systems the load demands are fed into a digital computer in the loop and an analog computer connected in the loop regulates, or controls, the power stations in accordance with the output of the digital computer.

This prior-art apparatus has not afforded the precise and reliable control which is necessary to achieve the maximum available economies in a power complex. It is then an object of this invention to overcome the deficiencies of the prior-art methods of controlling a power complex and to provide a method in the operation of which substantial, higher economies shall be achieved than is feasible with prior-art apparatus.

This invention concerns itself with the response to the error which is impressed on the input to the regulating apparatus and arises from the realization that the prior-art apparatus has the deficiency of responding to the instantaneous error by instantaneously attempting to change the operation of the generating stations of a complex so as to eliminate this error. Where the demands of the load are changing while the correction is taking place, the effect of this correcting operation may be to change the power delivered by a station in one sense at one instant and to change it back in the opposite to the original magnitude or to a lower or higher magnitude than the original magnitude at the next instant. It has been realized that this back-and-forth change of the operation of a generating station is highly costly and it is a specific object of this invention to eliminate this change.

In accordance with this invention, the correction is introduced into the stations of a power complex in such a way as to suppress response to instantaneous error, and instead, to control the level of power generation as a function of anticipated errors. This mode of operation requires that the control apparatus determine not only the actual error at any instant, but also the anticipated error; this is accomplished by performing on the basis of the actual errors as measured in the system, calculations based on the past history of operation of the system from which the anticipated error is derivable.

In controlling a power complex, the tie-line power flow and the frequency are measured at repetitive time intervals and the error with respect to scheduled commitments is determined from these measurements; control is also performed with respect to the instantaneous power delivery of the complex, measured at the generator output. In determining the anticipated error with regard to meeting a scheduled power demand, it is necessary to derive, from the measurements of the frequency and the tie-line power flow, the errors during succeeding measurements taking place at predetermined time intervals. The anticipated error is derived by taking the weighted average of these errors in meeting a scheduled power demand at the beginning and end of a selected interval and also by taking the weighted time differential of this weighted average. The weighting factors are fractions determined on the basis of the past history of the power system. To clarify conventional notations used hereafter in the equations, the "weighted average" of the errors is shown as $\overline{\text{ERROR}}$ and the "weighted time differential" is shown as $\overline{\overline{\text{ERROR}}}$. The weighting factors $\overline{\text{ERROR}}$ and $\overline{\overline{\text{ERROR}}}$, futhermore, are fractions; and as noted, are determined on the basis of the past history. The "history" is a time function, expressed as the time periods $n$-T; $n$-2T; $n$-3T; etc. of the error factors as determined by the control system. The weighting factors thus are determined empirically in accordance with achieving the desired response of the system, such as to afford critically damped control in response to step changes in the load demands.

An analog computer alone, or in a hybrid system, does not lend itself to the carrying out of the operations here involved. In an analog computer, the functions are carried out by the analog hardware and sufficient hardware cannot be provided in the space and with the facilities available for the purpose of computing the anticipated error. In the practice of this invention, a digital computer is connected to the power complex and particularly within a system control loop therefor, not only to translate the received load and frequency signals instantaneous into error measurements, but also to convert the instantaneous errors as thus derived into anticipated errors and based on the anticipated errors to calculate and transmit the necessary correcting signals or commands to the power stations of the complex. The computer used in the practice of this invention includes a memory, for example a magnetic drum which rotates at a high speed, and which carries data covering the system and its numerous operational ramifications. This data is selectively transmitted to a memory core as it is to be used.

Typically, the memory drum of this computer has impressed thereon the complete data covering the power generating facilities of the complex, such as the generator characteristics, cost factors for each generator unit, planned commitment (or so-called "unit" commitment) of the generating units, etc., the weighting factors is i.e. the past history error factors and the other necessary components such as the hardware interfaces to the digital computer, and controlling computer programs. On receipt of the load and frequency data, the computer operates to calculate the regulating or correcting commands for transmission to the generating units, suppressing response to the instantaneous errors but to suppress correcting for the anticipated errors.

Typically, the computer receives the following data at its input.

1. Tie-line power flow.
2. Frequency.
3. Non-conforming load power flow.
4. Supply power-flow from each of the generating stations.

The computer operates to read this data at short time intervals, typically once per second. In addition, the computer may impress on the generating stations a schedule or program typically for each 24 hour interval. The generating units at each of the stations are pre-selected for operation at certain predetermined time periods over this 24 hour interval, and at preset generating levels, in accordance with this program. This program or schedule is referred to as the unit commitment program. The control to correct for the anticipated error as afforded by the herein disclosed system may be visualized as superimposed on the control functions as afforded by this 24 hour scheduling program. The anticipated error signals are computed at predetermined intervals, which typically may be of 4 seconds duration, and the correcting signals are impressed on the generating units or station at these intervals. The averaging to compute the anticipated error is carried out over longer intervals. The commands, computed as binary numbers, are converted by the computer into pulse-width modulated pulses for each of the generating stations, the duration of which pulse determines the extent of the change and the polarity of which etermines the polarity, i.e. direction, of the change in each case, i.e. as to each generator.

An important feature of this invention is the real time functioning of the computer. The digital computer operates substantially more rapidly in computing the corrections than the generating stations are capable of responding to the commands, and thus there must be afforded, for the generating stations, an adequate time for response to each preceding set of commands and thus to permit reasonable stabilization, before a new set of commands is impressed. Essentially, the time taken by the computer to compute anticipated error is short compared to the time required for the generating units to respond, and thus takes effect, for example, in the ratio of 1:10,000. The moves or changes in the generating stations are in this economic condition; that is, they are directed to achieving the utmost in economy of power generation.

In one actual installation, which may be considered as illustrating a typical situation, a digital computer having an 8000 word high-speed core and a 32,000 word memory drum is used in the control of a public utility system in a moderately populated area. This computer is capable of accepting inputs from 12 individually telemetered tie-line interconnections and from eight generating units but can be modified to cover 18 tie-lines and 20 generating units. Since the control operations of the system only consume about 20% of the computer time of the computer, the other 80 percent is available for other computations relating to the system.

The control operation of the computer operates to (1) minimize the sustained tie-line power flow error and the sustained frequency errors, and (2) minimize total generator fuel costs, without completely sacrificing one consideration to achieve an optimal solution to the other.

The computer operates to change the output of any generator taking into consideration the following factors:

a. Economics, including both incremental costs of generation and transmission losses.

b. Machine limitations, including boiler limitations, thermal limitations of boiler and turbine, wear of governor control mechanism by excess control action, and maximum and minimum economic and absolute limits.

c. System error or area-control error, including the computation of sustained error and swing error as well as anticipated errors, including anticipation of the change of and the rate of change of sustained error.

The prior art hybrid system described above is not capable of serving these purposes. To take into consideration only a small fraction of the above-listed factors would require more control system hardware than is feasible in such prior art systems.

Because the digital system here disclosed is capable of developing an anticipated error, every move made by the digital system, to the extent practicable, is the most economical move. This contrasts sharply with the prior-art analog systems that determine present instantaneous error and adjust to this error and later "reshuffle" the parameters of power demands to each generator to achieve economy.

Typically, the computer of the above-described system is constructed and programmed to perform certain basic functions on an on-line or shared-time basis, including load and frequency control, and economic dispatching. Data logging, precommitment of generating stations (unit commitment), and economic interchange; that is, calculation of the cost of buying from, or selling power to, neighboring utilities, also may be performed on-line, or alternately, off-line as advisory functions, if desired.

In the load and frequency control program, the computer computes area-control error from analog values provided by suitable sensors, and which are converted to digital input quantities to the computer and outputs individually pulse width adjusted control pulses on the basis of anticipation of the power output required from each generating unit or station. This complete control cycle includes: scanning of telemetered inputs of unit and tie-line loads and system frequency; computing a predicted and smoothed area control error; and computing and outputing control pulses. Typically, the scanning is carried out once each second but the output pulses are transmitted every four seconds.

The economic dispatch program uses penalty factors to evaluate transmission line losses as a function load. Each dispatch is economic within the limits of permissible response rates and maximum power generating capability of the respective units.

Area-control error is computed by scanning individual tie lines and frequency every second, converting these quantities to digital units, applying scaling factors, and comparing actual tie-line power and frequency with desired net interchange power and scheduled frequency, which may be manually input to the computer by the operator. Through digital techniques, the computed area-control error is smoothed, taking into account past history errors, and is examined for determining the anticipated change and the anticipated rate of change, for anticipatory control purposes.

Digital computations employing prediction techniques based on the smoothed steady state area control error and the computed time rate of change of error are used to anticipate excursions of area control error resulting from changes in system load, thus providing increasing control action, but in a smoothed operation, for a rapidly changing system load and, correspondingly, rapidly changing area-control error. As a further check on system efficiencies, achieved by the digital control, the error quantities can be integrated and compared with the total correction commands transmitted by the control pulses and the overall system thus can be adjusted for any desired regulation consistent with allowable control action and response capabilities of the generating units.

Each generating unit is also controlled by schedule programs as determined by the digital computer. The generating unit controller sub-routine compares the assigned power for each unit with the actual power generated thereby, as telemetered from the power sensor for each such unit to the computer control system, and produces control pulses to bring unit generation to the desired value.

In carrying out economic-dispatch programming, the computer determines the most economic loading of the generating units, based on incremental costs of generation for each unit and transmission losses. It supplies to the load and frequency control program all necessary information for the economic loading of units. The economic dispatch programming may be used by a production cost program, which, in turn, is used by an interchange transaction, i.e. economy interchange program an, interchange billing program, and the unit selection, i.e. unit commitment program.

The input data to the computer for economic dispatch programming is the actual power flow at tie lines, power flow for non-conforming loads, actual power generation as derived by corresponding sensors and telemetered to the computer, and incremental cost curves, encompassing the fuel costs for each generator, and which may be input at the operator's console.

There is also a provision made for the economic dispatch programming to be used in an off line mode, permitting the dispatcher to input manually, selected values of system load, tie-line loads, and non-conforming loads, and obtain a printout of the economic dispatch, of all generating units.

Spinning reserve criteria can be automatically examined with the aid of the computer either during each control cycle, e.g., every four seconds or during each economic-dispatch computation which typically is a much longer interval, e.g. 5 minutes. An alarm may be provided to signal inadequate margin.

Through the load and frequency control program, in conjunction with the economic-dispatch program, and production costing program as an adjunct to the economic dispatch program, the cost of setting the maximum turbine limits lower than the maximum capability limits (as a result of steam plant coal mills, fans, pumps, etc. being out of service) can be determined.

The scan-log-and-alarm program of the computer sets hourly logging of desired system quantities and also transmits alarm messages for emergency or abnormal conditions.

In addition, a circuit breaker logging program supervises the operation of all the circuit breakers in the system, e.g. 200 in number, giving the name of breaker, action, and time of breaker operation within a resolution of 100 milliseconds. Supervisory control equipment provides the input information necessary for the circuit breaker logging system.

The following Table I comprises a simplified flow diagram of the unit commitment program.

TABLE I

The unit commitment program provides for scheduling the starting up or shutting down of generating units to meet daily system load variations. Table I, as noted, is a simplified flow diagram for the selection, or unit commitment program. This program enables the dispatcher to select the generating units to be operated to meet the daily forecast load by means of dynamic programming techniques. This program can be developed to handle a large number, e.g. 20, generating units, and provide a desired number, e.g. 32, of combinations of units for each hour, over 24 hours duration.

The economic interchanging program of the computer enables the dispatcher to determine the cost or value of fixed amounts of interchange power. The computer uses the economic dispatch, transmission loss, and production cost programs to enable the dispatcher to evaluate the sale or purchase of power or a split savings basis.

In typical operation of the control, the computer provides every evening at about 11:00 p.m. a forecast of requirements as to each generating unit of the system, for the next 24 hours, including the exact power output required, and the times when each unit should be put on-line and taken off. In addition, the projected overall operating costs of each unit for the next day are presented.

In carrying out this forecast, the computer selects, as noted above, an exemplary number, e.g. 32, of likely combinations of generating units which may be employed to meet the load demands for the next 24 hours as based on past history of the demands, and determines the cost of each combination for each hour. It selects the best set positions for each hour and then for the hour, the computer looks at the anticipated load and calculates the least expensive way to meet this load. In this way, the computer maps out the operation of the entire system from midnight to the following midnight. Once the forecast is accepted, the computer schedules the operation of the system. Control signals are then automatically sent to each unit of the system according to this forecast for the next 24 hours and an hourly log of actual conditions of the system is provided at the dispatcher's console. The control to meet anticipated errors is superimposed on this schedule and pulses to effect the required changes are transmitted to the generators.

The novel features considered characteristic of this invention are disclosed above. For an understanding of this invention, both as to its organization, and as to its method of practice, together with additional objects and advantages thereof, reference is made to the following description of the mode of practice of this invention taken in connection with the accompanying drawings, in which:

Figure 1:
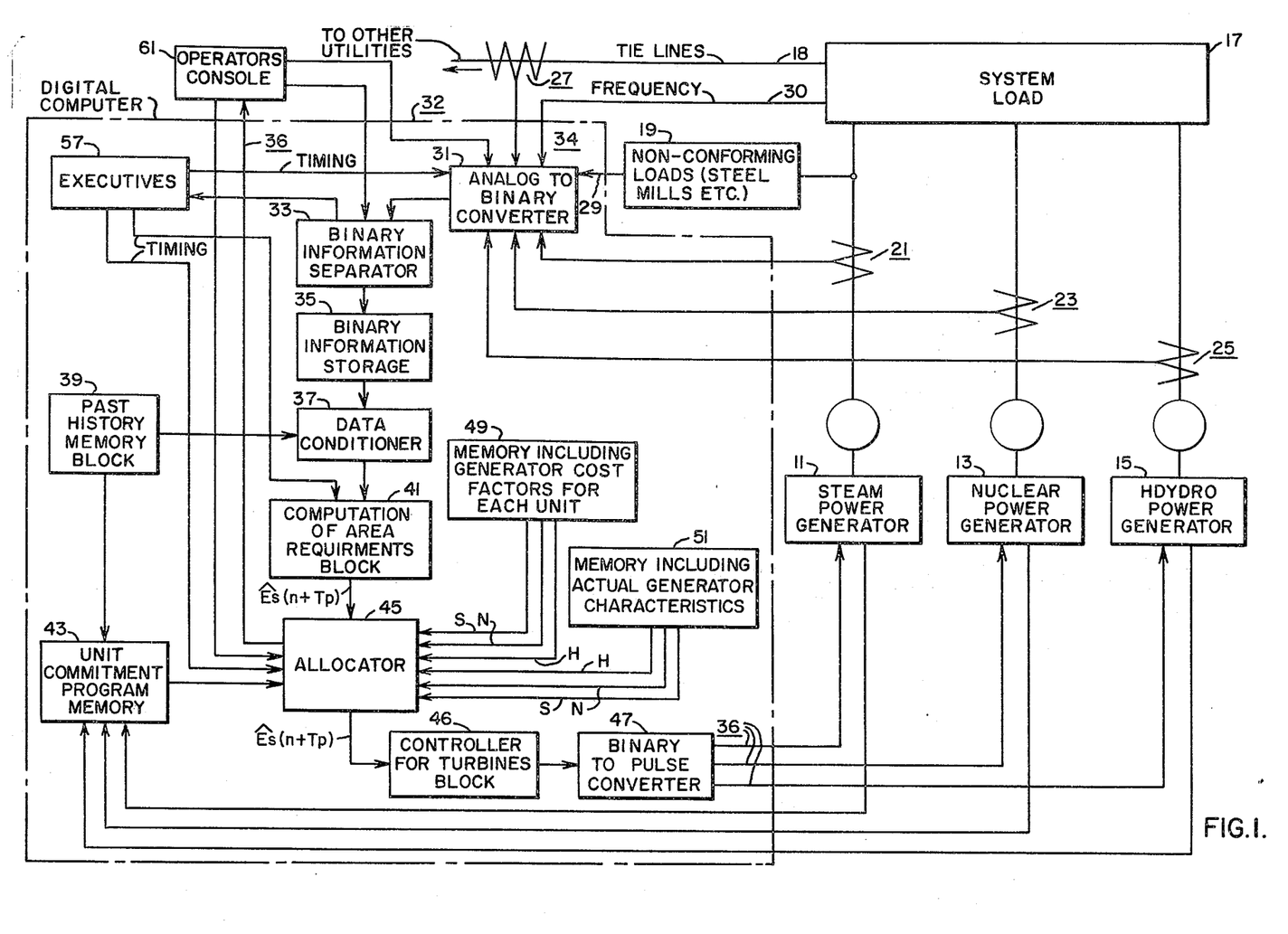
FIG. 1 is a block diagram showing apparatus with which this invention is practiced, including hardware functions of operator's console, generalized system load (including non-conforming loads), analog to binary converter (A/D coonverter) and generator control (steam, nuclear and hydro) and software functions (implemented in the digital computer) to show an executive, binary information separator and binary to pulse converter (computer output/system interface), memory block assignments and application programs.

In FIG. 1, this invention is shown as applied to a typical power system or complex in which power is generated and used. Such a system may include a plurality of generating stations including, typically a steam-power generator 11, nuclear-power generator 13 and a hydroelectric generator 15. These generators 11, 13, 15 supply a system load 17 through the usual buses and conductors. The power system also includes a plurality of tie-lines represented in FIG. 1 by a single line 18; there are also in this system a plurality of non-conforming loads 19 such as steel mills, fabricating plants which may have numerous resistance and arc welders and automobile-body presses which include heavy-duty motors repeatedly turned on and off. The tie-lines and the conductors from the generators are provided with the usual telemetering apparatus 21, 23, 25, 27 represented for illustration purposes by current transformers from which the power flow from the generators and the power flow through the tie lines are measured. In addition, there are telemetering conductors 29 and 30 for the non-conforming load power flow and for supplying an indication of the instantaneous frequency at which the system is operating.

The apparatus used in the practice of this invention also includes a digital computer 32. There is also an operator's console 61 connected to the computer. The input 34 of the computer 32 is supplied with voltage signals indicative of, and corresponding to, the power flows through the tie-lines, represented as $\Sigma P_{Ti}(n)$ [see definition 2, below], the actual power output from the generators represented by the terms $P_A(n)$ [see definition 10, below] and $\Sigma P_A(n)$, and through the non-conforming loads represented by the term $\Sigma P_{NCi}(n)$ [see definition 6, below], and of the frequency deviation of the system indicated by the term $\Delta F(n)$ [see definition 5, below]; these terms appearing hereafter in equations which define the system operation and control functions. The input 34 is also supplied with data and commands from the operator's console 61. These inputs correspond to the terms $P_0(n)$, $\overline{P_0(n)}$, $T_s$ and $T_p$ [see definitions 22, 20 and 21, respectively, below]. The outputs 36 of this computer 32, as before noted, are pulse width modulated control pulses which are supplied to control circuits for the generators and which control their operation in accordance with the load demands. Allocator 45, which operates through controller 46 and converter 47 to produce the outputs 36, also supplies data and information to the console 61.

As noted, the outputs 36, provided for control of the individual generator units as a function of economic dispatch programming, are derived from the basic control function output of allocator 45 of the computer, represented as the term: $\overline{E}_Q(n + T_P)$. The · notation indicates that the term $\overline{E}_Q(n + T_P)$ is a predicted control value for each generator unit. The derivations for this term and the equations expressing the operation and control function of the system are set forth in detail hereafter. To afford an insight into the functions resulting in the general output term $E_Q(n + T_P)$, however, an explanation of the related computation will be provided in detail below.

Initially, a term $P_0(n)$ [see definition 22, below] indicative of the power at the start of the sampling time interval $T_S$ [see definition 20, below] is made available. Typically, the operator sets the term $P_0(n)$ at the nth instant into the operator's console 61. Also at this time, the operator may set the time rate of change of the term $P_0$ differentiated in the nth interval with respect to time, i.e. $\overline{P_0(n)}$. It is understood that the indicated change of power will be effected within the time interval $T_S$. The scheduled or preset interchange of power $P_S$ demanded of the system under consideration [see definition 2, below] is calculated in accordance with the following equation in block 41:

$$P_S(n) = \overline{P_0(n)} + T_S \dot{P}_0(n) \qquad [1]$$

The calculated value $P_S$ may be either an increase or a decrease in power and, as indicated by equation [1], permits not only an incremental change in power, but also a time rate of change of power within the total system.

As described above, the telemetering apparatus 27 associated with the tie-lines 18 provide a measure of the power in each tie-line as indicated by the term $P_{Ti}(n)$. It is noted that the subscripts $i$ identify a particular power generating unit, including steam turbines, nuclear power sources, etc. Sensing apparatus also associated with non-conforming loads such as steel mills, etc., provide signals $P_{NCi}(n)$ indicative of their power requirements [see definition 6, below].

Typically, as shown in FIG. 1, the operation of this computer is based on digital representations of values, $P_{Ti}(n)$, and frequency deviation $\Delta F$, in accordance with the binary numbering system. The computer 32 includes a voltage-to-binary, or analog-to-digital converter 31 which converts the analog values of voltages indicating power flows and frequency, to binary numbers. The computer also includes an executive 57 which controls its operation and which operates to set the voltage-to-binary converter 31 to convert the signals from the generators, the tie-lines and the non-conforming loads and the frequency signals once each second.

The computer also includes a binary information separator 33 which separates the information converted by the voltage-to-binary converter 31 and impresses this information in a binary-information storage 35. The data stored in the binary-information storage 35 is supplied to a data conditioner 37 where it is conditioned in the light of the past history of the operation of the network derived from a past-history memory block 39.

The past history of the operation of the network is represented for the system by the terms:
$$\overline{E_S(n - T_S)}, \overline{\dot{E}_S(n - T_S)}$$
and for individual turbines, by the terms:
$$\overline{E_Q(n - T_S)}, \overline{\dot{E}_Q(n - T_S)}$$
The terms $\overline{E_S(n - T_S)}$ and $\overline{\dot{E}_S(n - T_S)}$ represent, respectively, the weighted average of system error at the instant $(n - T_S)$ and the system rate of change differentiated in the interval $n$ with respect to time. Further, the terms $\overline{E_Q(n - T_S)}$ and $\overline{\dot{E}_Q(n - T_S)}$ are respectively the weighted average of the power generating error for the ith turbine at the beginning of the anticipating interval $T_S$ before the nth interval, and the time rate of change of this term differentiated in the interval n with respect to time.

The data from the data conditioner 37 is supplied to a computation of area-requirements error block 41 where the error is calculated. The data from the data conditioner 37 is represented by the terms:
$$P_{Ti}(n), P_{NCi}(n), B\Delta F(n), \text{ and } B$$
The term B, indicative of the frequency bias or power variation per unit deviation in frequency [see definition 4, below], is stored in block 41; it is noted that this term B may be changed or inserted within block 41 from the operator's console 61. As described above, the various required inputs have now been supplied to the computation of requirements block 41, and the computation of the instantaneous area-control error (ACE) for the interval $n$ is calculated in block 41 in accordance with the following equation:

$$E_A(n) = \Sigma P_{Ti}(n) - P_S(n) + B\Delta F(n) \qquad [2]$$

As noted above, the term $P_S(n)$, indicative of the scheduled power interchange, has been previously computed in the block 41 and is therefore now available for the further ACE calculation indicated by equation [2]. The calculation performed by the block 41 in accordance with equation [2] sums all of the tie-line telemetry inputs and adds thereto the non-conforming load term and frequency deviation term $\Delta F$ modified by the constant B for the entire system, and subtracts therefrom the new power demand placed on the system $P_S(n)$. With regard to FIG. 2, the instantaneous area-control error term $E_A(n)$ is provided by the summing device 103 and applied to the anticipatory controller 101 to provide for the individual control of each of the turbines, as will be explained in more detail below. The computations as described above with respect to equations [1] and [2] may be solved by a computer under the control of an ACE computer program.

As indicated initially, it is desired to provide signals indicative of the anticipated error for the $i$th turbine $\hat{E}_Q(nG2zT_P)$. Before this value may be calculated, it is necessary to calculate an anticipated error for the entire system $\hat{E}_S(nG2zT_P)$, which calculation is now to be described. First, the telemetering apparatus 21, 23 and 25, as shown in FIG. 1, provide corresponding signals termed $P_A(n)$ [see definition 10, below] for each turbine, which are indicative of the actual power generated for each turbine of the subject system. Next, to achieve ultimately the system anticipatory value, it is necessary first to calculate the instantaneous error $E(n)$ [see definition 14, below] at the end of interval $n$ for each turbine. $E(n)$ is calculated in the controller for turbines block 46, shown in FIG. 1, in accordance with the following equation:

$$E(n) = K[P_D(n) - P_A(n)] \quad [3]$$

Figure 2:
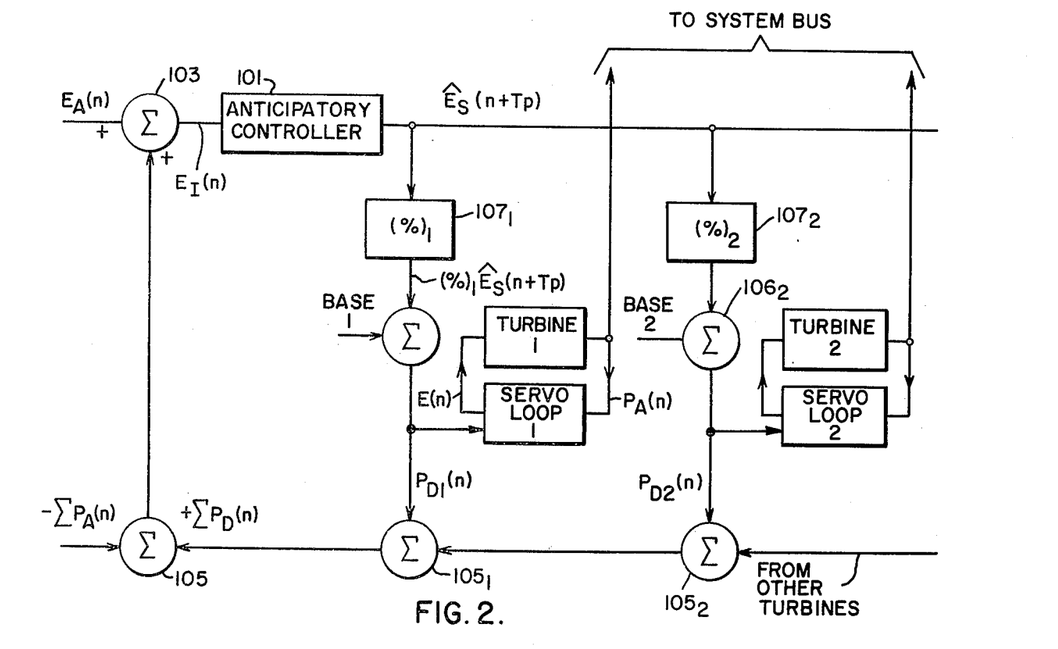
FIG. 2 is a diagram showing in detail a feature off this invention, implemented within the digital computer as a model of the system being controlled, functioning to receive signal and data inputs, perform computations and issue output signals for control of generators.

In equation [3], the term $P_D(n)$ is the power required of the individual, $i$th turbine at the interval $n$ [see definition 8, below], and the term $K$ indicates the gain factor of a particular regulating loop for each turbine, as shown in FIG. 2; both of the aforementioned terms are stored in the block 46. Further, the term $P_D(n)$ is computed from the information stored in the memory including generator cost factors for each unit block 49. When the values $P_A(n)$ are derived as explained above, the controller for turbine block 46 serves to calculate the instantaneous error for each turbine $E(n)$ in accordance with equation [3], given above. Thus, the instantaneous error term $E(n)$ for each turbine in indicative of the difference between the demanded power and the actual power delivered at each turbine, modified by a gain factor $K$. Thus, the error term $E(n)$ is weighted during the nth interval by the factor $K$, as will be explained later, to provide a gain or damping effect for the calculation of the overall system error equation.

Returning now to the consideration of the overall system control, a first intermediate error is calculated as shown in FIG. 2 in accordance with the following equation:

$$E_I(n) = E_A(n) - \Sigma P_A(n) + \Sigma P_D(n) \quad [4]$$

More specifically, the power demanded from each turbine $P_{Di}$ is summed as by the summing devices $105_1$, $105_2$, etc. to apply to the summing device 105 the term $\Sigma P_D(n)$ indicative of the power demand for all of the turbines. In addition, the actual power for each turbine $P_{Ai}$ is derived as explained above and is summed to provide the term $\Sigma P_A(n)$ for all turbines and is applied to the summing device 105. Further, the instantaneous area-control error $E_A(n)$ as obtained by the calculation of equation [2] is applied to one input of the summing device 103, whereas the output of summing device 105 is applied to the other input of the summing device 103. The output derived from the summing device 103 is the solution of equation [4] and provides the intermediate error term $E_I(n)$, which, in turn, is applied as the input to the anticipatory controller 101.

Next, a second intermediate error term $E_0(n)$ is calculated in accordance with the equation:

$$E_0(n) = K_S E_I(n) + E_0(n - T_S) \quad [5]$$

In this calculation, the first intermediate error term $E_I$ as derived from equation [4], is modified by the term $K_S$ [see definition 18, below] indicative of an overall system gain for effecting a damping of any errors which may be introduced into the control loop of this system. The term $E_0(n - T_S)$ is indicative of the second intermediate error at the beginning of the interval $T_S$ before the instant $n$, and is stored in block 39.

Next, in deriving the overall system anticipated error at the instant $n$, the weighted average term $E_S(n)$ [see definition 12, below] is calculated in allocator 45 in accordance with the following equation:

$$\overline{E_S(n)} = (1-G2\,\alpha)[\overline{E_S(n-T_S)} + T_S\,\overline{\dot{E}_S(n-T_S)}] + \alpha E_0(n) \quad [6]$$

In accordance with equation [6], the weighted average at instant $n$ involves the summation of the weighted average system error $\overline{E_S(n-T_S)}$ for the previous time interval, i.e. $(n-T_S)$ plus the time rate of change of system error $\overline{E_S(n\,G21\,T_S)}$ for the previous interval $(n-T_S)$, both of which are multiplied by a modifying term, to be explained. As indicated above, the terms $\overline{E_S(n\,G21\,T_S)}$ and $\overline{E_S(n\,G21\,T_S)}$ are stored, for example, in memory block 39. Finally, equation [6] involves the summation of the aforementioned terms with the second intermediate error term $\overline{E_0(n)}$ as derived from equation [5], modified by the weighting term $\alpha$. Similarly, the weighted time differential of the system error $E_S(n)$ for the interval $n$ is calculated in accordance with the following equation:

$$\overline{\dot{E}_S(n)} = (1-\beta)\,\overline{\dot{E}_S(n-T_S)} + \frac{\beta}{T_S}[E_0(n) - \overline{E_S(n-T_S)}] \quad [7]$$

The terms for the weighted average and the derivative terms as explained above, as well as the term $E_0(n)$ as derived from equation [5], likewise appear in equation [7]. The values of the weighting factors $\alpha$ and $\beta$ are determined from the requirement that they satisfy the following conditions:

1. The regulation of power generation must be such that a critically damped condition exists.
2. The noise must be minimized.

Because of condition 1, the equation:

$$4\beta - \alpha^2 - \beta^2 - 2\alpha\beta = 0 \quad [8]$$

must be satisfied. The noise N is given by the following equation:

$$N = \frac{2\alpha^2 + \alpha\beta + \beta^2}{\alpha\,(4-\beta-2\alpha)} = 1 \quad [9]$$

To minimize the noise, $N = 1$.

The above equations may be solved for $\alpha$ and $\beta$ in the computer and the values of $\alpha$ and $\beta$ may be stored in the allocator 45.

In summary of the above series of calculations, it may be seen from equation [1] that the operator may introduce changes in power which will result in a new value of $P_S(n)$. The value of $P_S(n)$ is applied, in turn, to determine the instantaneous area-control error $E_A(n)$ in accordance with equation [2]. Thus, if an incremental or step change is required of the scheduled power $P_S(n)$, a step change will be imparted to the instantaneous area-control error $E_A(n)$. To dampen the effect of such an incremental change, intermediate calculations are introduced to derive the term or value $E_0(n)$ to be applied to the equations [6] and [7], whereby any system step error is applied gradually over a time period determined by the value of the system gain term $K_S$ as seen in equation [5] above.

Finally, the system anticipatory error $\hat{E}_S(n + T_P)$ is derived for the interval $(n + T_p)$ in accordance with the following equation, which may be calculated in allocator 45:

$$\hat{E}_S(n+T_p) = \overline{E_S(n)} + T_p \overline{\dot{E}_S(n)} \qquad [10]$$

As an inspection of this equation reveals, the various terms are derived from the values calculated by equations [6] and [7], as given above, and this equation [10] is calculated to provide an anticipatory value of the error $\hat{E}_S(n+T_P)$ for the entire system for the interval $(n+T_P)$. The above-given calculations to derive the smoothed and anticipatory value $\hat{E}_S(n+T_P)$ of the tie-line swing deviation may be carried out in a computer in accordance with a load and frequency control program. This determination not only provides a linear prediction, but also smooths out process noise, numerical noise and sample time quantizations.

In addition to receiving the area-control error from block 41, the allocator 45 receives data from the unit commitment program memory 43, from the memory 49 which contains the generator cost factor for each unit 11, 13, 15 and from memory 51 including the generator characteristics. On the basis of the data received from these components 41, 43, 49, 51, and specifically from component 41, the term:
$\hat{E}_S(n+T_p)$ and from components 43, 49, and 51, the term: $(\%)_i$ and $BASE_i$ the allocator 45 determines in a series of calculations to be performed on a computer in accordance with the economic dispatch program, what change is to be made in each turbine and transmits the necessary data to a controller-for-turbines block 46. The allocator is set by the executive 57 to transmit this data at the selected intervals, for example, 4 seconds. The block 46 supplies the data which it has in binary form to a binary-to-pulse converter 47 which converts the binary data from the allocator into pulses. The converter 47 is connected to the generators and supplies each of the generators with the necessary control pulses in accordance with the desired incremental change in the operation of the generator.

The separation of the computer 32 into blocks in FIG. 1 is on a functional and not necessarily a structural basis. Structurally, the parts of the blocks may be intermingled with the memory drum, the memory blocks and other parts of the computer.

The operation of the apparatus in accordance with this invention is based on the following major power-system functional requirements.

1. The control system shall drive the area-requirement error to zero at a rate consistent with the overall power system and the dynamic characteristics of the individual generating units 11, 13, 15.

2. The control system shall load each generating unit 11, 13, 15 under control to its most economic point and if feasible all tie-line swings shall be handled within economic limits.

Working within these major functional requirements, the basis control computations that the computer makes are presented below. In these equations:

| | | |
|---|---|---|
| $E_A(n)$ | = Instantaneous area-control error at instant n where n is on the time interval for which the error is computed $E_A(n)$ is computed in block 41. | 1, |
| $P_{Ti}(n)$ | = Tie-line power flux for the ith tie-line at instant n, $P_{Ti}(n)$ is supplied through telemeter 27. | 2, |
| $P_S(n)$ | = Scheduled or preset net interchanged power flow at instant n - Demanded power into, or out from, the system. - $P_S(n)$ is computed in block 41. - but can be changed from operator's console 61. | 3, |
| B | = Frequency bias or power variation per unit deviation in frequency. - B is stored in block 41 but can be changed from operator's console 61. | 4, |
| $\Delta F$ | = Deviations in frequency. - $\Delta F$ is recieved through line 30. | 5, |
| $P_{NCi}(n)$ | = Non-conforming load for ith installation at instant (n) - $P_{NCi}(n)$ is received through line 29. | 6, |
| n | = Discrete computer solution interval (typically 4 seconds) - n is set by executive 57 but can be varied from console 61. | 7, |
| $P_{Di}(n)$ | 32 Power demanded from ith turbine at instant (n) - $P_{Di}(n)$ is computed in allocator 45. | 8, |
| $Base_i(n)$ | = Base power output of ith turbine at instant n: - $Base_i(n)$ is computed and stored in allocator for economic dispatch. The computation $Base_i(n)$ is based on the principle that incremental cost for all generators should be equal. | 9, |
| $P_{Ai}(n)$ | = Actual power output of ith turbine at instant n. - $P_{Ai}(n)$ is derived from telemeters 21, 23, 25. | 10, |
| $E_S(n)$ | = System instantaneous error at instant (n). - $E_S(n)$ is computed in allocator 45. | 11, |
| $\overline{E_S(n)}$ | = Weighted average of system error at instant n averaged from the errors at the beginning and end of an averaging interval. - $\overline{E_S(n)}$ is computed in allocator 45; the averaging intervals may be of different length than the intervals n. | 12, |
| $\hat{E}_S(n+T_P)$ | = Anticipated error at instant n. $\hat{E}_S(n+T_P)$ is computed in allocator 45. | 13, |
| $E_{(n)}$ | = Instantaneous error at instant n. $E_{(n)}$ is computed in block 46 and stored in this block. | 14, |
| $\hat{E}_{Qi}(n + T_p)$ | = The anticipated error for the ith turbine at the end of the anticipating interval $T_p$ following the nth interval. - $E_{Qi}(n + T_p)$ is stored in block 46. | 15, |
| $(\%)_i$ | = Percent participation of any turbine or power unit in a required incremental change in power. This is inserted in the allocator 45 either by block 49 or from the console 61. | 16, |

| | | |
|---|---|---|
| K | = Gain of regulating loop at turbine; this gain may be expressed as a polynomial function of turbine load. - K is stored in block 46 but can be changed from console 61. | 17, |
| $K_S$ | = Overall system gain. | 18, |
| $\alpha, \beta$ | = Weights for weighted averages. $\alpha$ and $\beta$ are stored in allocator 45. | 19, |
| $T_S$ | = Duration of each sampling time interval. (Typically 4 seconds) - $T_S$ is stored in executive 57 but can be changed from console 61. | 20, |
| $T_p$ | = Length of predicting or anticipating interval; $T_p$ may be longer than $T_S$ and is stored in allocator 45 but may be changed from console 61. | 21, |
| $P_O(n)$ | = The power at the start of interval $T_S$ and this value is stored in block 39. | 22, |

The desired power setting for each turbine computed at time, $n$, takes into consideration system conditions of time, $n + T_P$, as follows:

$E_S(n + T_P)$ is the anticipated system error at the $n$-timing interval duration, $T_P$, after the $n$th interval. $E_S(n + T_P)$ may be computed over a longer sampling interval $T_P$ than $T_S$ which is typically 4 seconds. $E_S(n + T_P)$ is inserted in block 46 for computation of the regulating pulses.

As stated above, for each turbine the instantaneous error $E(n)$ at the end of an interval $n$ is given by $$E(n) = K [P_D(n) - P_A(n)]$$

As shown in Fig. 2, the value $E(n)$, indicative of the instantaneous error at the time $n$ for each turbine, is calculated within the servo loop associated with each turbine.

Block 46 has stored the values of $P_A(n)$ and $K$ and when $P_D(n)$ is received, $E(n)$ is computed in this block. $P_D(n)$ is computed from the information and stored in such block as 49.

Next, $P_D$ is calculated for the $i^{th}$ turbine by the equation:

$$P_{Di}(n) = \hat{E}_S(n + T_P) (\%)_i + Base_i(n) \qquad [11]$$

Where $Base_i$ is the base power output for the $i$th turbine [see definition 9, above], and $(\%)_i$ is the percent participation of the $i$th turbine in a required incremental change of power see definition 16, above] calculated in accordance with an economic dispatch program. As seen in FIG. 2, these values for the particular corresponding turbines are applied to the circuits 107 to modify the value of the smoothed and predicted system error $\hat{E}_S(n + T_P)$ before being applied to the corresponding summing device 106. The output of the summing devices 106 is the calculated power for the $i$th turbine at time $n$. A review of equation [11] indicates that in order to determine the calculated power for the $i$th turbine, it is necessary to derive first the anticipated system error $\hat{E}_S(n + T_P)$, which calculation, in turn, is used to determine the power required for the $i$th turbine.

Let $E_Q(n)$ = the error for this turbine at the beginning of the $n$th interval.

Then the weighted average $\overline{E_Q(n)}$ for interval $(n)$ is given by:

$$\overline{E_Q(n)} = (1-\alpha) \overline{E_Q(n - T_S)} + T_S \overline{\dot{E}_Q(n - T_S)} + \alpha E(n) \qquad [12]$$

where, $\overline{E_Q(n - T_S)}$ is the weighted average error of each generating unit for the preceding interval $(n - T_S)$.

$$\overline{\dot{E}_Q(n)} = (1 - \beta) \overline{\dot{E}_Q(n - T_S)} + \beta/T_S [E(n) - E_Q(n - T_S)] \qquad [13]$$

Note that the expressions $\overline{E_Q(n)}$ and $\overline{\dot{E}_Q(n)}$ above are simple fractions less than 1. The second term in equation for $E_Q(n)$ is the weighted incremental error divided by the time over which it occurred. The anticipated error $\hat{E}_Q(n + T_P)$ see definition 15, above] at the end of the interval $(n + T)$ is then given by:

$$\hat{E}_Q(n + T_P) = E_Q(n) + T_P \overline{\dot{E}_Q(n)} \qquad [14]$$

The anticipated error $\hat{E}_Q(n + T_P)$ is the error which is in accordance with this invention transmitted to each turbine in the form of pulses (through block 47) to regulate the turbine output.

A review of equations [3], [10], [11], [12], [13] and [14] indicates that the anticipated error for each turbine, $\hat{E}_Q(n + T_P)$, is derived by first calculating the anticipated system error $\hat{E}_S(n + T_P)$, which value in turn is used to calculate the value of the power required for the $i$th turbine $P_{Di}(n)$. The power requirement of the individual turbine, in turn, is used to calculate the instantaneous error $E(n)$ at the instant n for each turbine. Further, as shown in equations [12] and [13], the instantaneous error at the end of interval $n$, in turn, is used to derive the weighted average value $\overline{E_Q(n)}$ and the differentiated value $\overline{\dot{E}_Q(n)}$. Finally, the resulting values derived from equations [12] and [13] are summed to calculate the anticipated error for each turbine.

In the case of each turbine, the computer checks $E_Q(n)$ to determine that this quantity does not exceed the rate-limit action of the turbine; that is, the number of megawatts per unit time that the turbine is permitted to change. In each case, also there is a check to determine the feasible maximum and minimum conditions of $E_Q(n + T_P)$ and to determine that the load to unload rate is low where a low rate is desired.

The values of $\alpha$ and $\beta$ above are determined as discussed above.

In the practice of this invention, the deisred or assigned power level for each generating turbine or unit is computed once the area-control error is calculated. In making the assigned power computation for each discrete computer control interval, it is of the utmost importance from a power systems operation viewpoint that no unnecessary turbine movement, i.e., controlled change in generating level, take place. In brief, if the tie line swing is returning to zero, no control action should be given that will result in overshoot or hunting. While, if it becomes obvious that the swing is going to drive the system in the undesired direction in the very near future, then control action is required consistent with the overall generator, e.g. boiler-turbine, dynamics. What is required then is a generalized anticipatory controller to provide enough overall regulation lead to realize a critically damped system, but with somewhat near optimum response or minimization of tie-line swing. Operation in accordance with the above equations achieves this purpose.

The basic control loop scheme in which the above equations are based in a typical type servo system for computing the assigned power to the generating units.

In addition, actual power from each unit or turbine under control is used as a decoupling device to avoid turbine-dynamic interactions during the line swings. The assigned power for each unit consists of two components. The economic base load value, Base L and the instantaneous tie line swing that the unit under control must carry. FIG. 2 illustrates the decoupling for a two turbine system.

In FIG. 2, the symbols $\Sigma$ are adders which add the inputs, vectorially or algebraically as required. The operations indicated in FIG. 2 are carried out in the computer. The anticipatory controller 101 is in the allocator 45. The effect of controller 101 is to decouple the individual units by operating through the loop including adders 103 and 105.

I claim as my invention:

1. The method of, operating a power complex to supply a system load and non-conforming loads; said power complex having a power generating network including a plurality of power generators and tie-lines to neighboring power generating networks, the said method comprising deriving from said complex at relatively short intervals, of the order of one second, signals indicative of:
   1. the load power supplied by each of said generators,
   2. the frequency of the power of said load,
   3. the power drawn by said tie-lines,
   4. the power drawn by said non-conforming loads; the said method also comprising converting said signals into digital values, separating said digital values into separate items of data each item corresponding to said items 1, 2, 3 and 4 respectively; storing said separate items; computing from a plurality of said items derived during a plurality of said intervals and the past history of operation of said complex, an area-requirement error which is based, for each computator on the anticipated trend of variation of said system load following the latest of said intervals, responsive to said area-requirement error producing electrical generator resetting signals to reset economically each power generator of said plurality of generators to the extent required to reduce said error to zero, and supplying said resetting signals to said generators to reset said generators as aforesaid.

2. A system for controlling a power system having a plurality of power generating units, said system comprising means for determining a representation of an actual power system generation error, means for determining a smoothed anticipatory system power generation error representation as a function of the actual system error representation, and means for controlling selected generating units in the power system as a function of the smoothed anticipatory system error representation.

3. A system for generating power in accordance with schedules of system frequency and of power interchange with a neighboring power system said system comprising:
   a. a plurality of generating units operative selectively to generate power in accordance with the schedule of power interchange, at least one tie-line to the neighboring power system, and means for measuring and providing representations of the tie-line power, the frequency deviation of the power generated by the given system with respect to the scheduled system frequency, and the power generated by each of the plurality of units;
   b. instantaneous error detecting means responsive to the representations of tie-line power, the schedule of power interchange and of frequency deviation for providing a representation of instantaneous system area-control error;
   c. calculation means for smoothing and weighting the representation of instantaneous system area-control error to provide an anticipated system power generating error; and
   d. unit control means for applying control signals to each of said generating units as a function of the anticipated system power generating error whereby the schedule of power generation is met.

4. A system as claimed in claim 3, wherein said system further includes sampling means for sampling at intervals of time $n$, $(n - T_S)$ and $(n = 2T_S)$, where $T_S$ is a sampling time interval, the tie-line power, the frequency of the given system and the power generated by each of said plurality of generating units.

5. A system as claimed in claim 4, wherein said calculation means provides a representation of anticipated system power generating error for the interval $(n + T_P)$, where $T_P$ is an anticipatory interval of time.

6. The system as claimed in claim 5, wherein said interval $T_P$ is greater than said interval $T_S$.

7. The system as claimed in claim 6, wherein said unit control means includes means for measuring the power demanded of each of said plurality of power generating units dependent upon a selected percentage of the anticipated system power generating error for determining the incremental change of power demanded of that generating unit in the interval $(n + T_P)$.

8. The system as claimed in claim 3, wherein said instantaneous error detecting means provides the representation of instantaneous system area-control error as a function of the sum of the representation of the tie-line power flow and the system frequency deviation modified by a value B indicative of the power variation of the given system per unit deviation of frequency, less the scheduled power demanded of the system.

9. The system as claimed in claim 8, wherein said calculation means includes a first intermediate calculating means for calculating a first intermediate error as a function of the sum of the instantaneous system area-control error as derived from said instantaneous error detecting means and the power required of all of said power generating units, less the measured power generated by all of said generating units.

10. The system as claimed in claim 9, wherein said calculation means includes a second intermediate calculating means for providing a second intermediate error as a function of the first intermediate error modified by a factor $K_S$ indicative of the power generating gain of the given power system to tend thereby to smooth the effect of the instantaneous system area-control error upon the determination of the anticipated system power generating error.

11. The system as claimed in claim 10, wherein said calculation means includes means for calculating the weighted average of the system power generating error for the interval n as a function of the sum of the weighted average system error for the preceding interval $(n - T_S)$ and the product of the rate of change of the system power generating error for the previous interval $(n - T_S)$ and the interval $T_S$, plus the second intermediate error, the aforementioned sum and the intermediate error being modified by selected weighting coefficients calculated to damp critically the power generation of the given system and to minimize noise.

12. The system as claimed in claim 11, wherein said calculation means further includes means for deriving the time rate of change of the system power generating error for the interval n as a function of the time rate of change of the system power generating error for the previous interval ($n - T_S$), and the second intermediate error less the weighted average system power generating error for the previous interval ($n - T_S$), the aforementioned values being modified by weighting coefficients calculated to critically damp the power generation of said plurality of units and to minimize noise.

13. The system as claimed in claim 12, wherein said calculation means provides a representation of the anticipated system power generating error for the interval ($n + T_P$) as the sum of the weighted average system power generating error for the interval n and the product of the time rate of change of the system power generating error for the interval n and the interval $T_P$.

14. The system as claimed in claim 13, wherein said unit control means includes means for providing a representation of the power demanded of each of said plurality of generating units dependent upon the percentage of participation by one of said generating units to meet the anticipated system power generating error for the interval ($n + T_P$), and upon the base power output of that turbine for the interval n.

15. The system as claimed in claim 14, wherein there is further included storage means for storing and providing representations of the incremental costs of power generation of each of said plurality of generating units, and comparison means for comparing the incremental cost of power generation as provided by said storage means for causing said unit control means to establish an economic condition wherein the base output of each of said plurality of generating units is set so that the incremental costs of power generation of each of said plurality of generating units tends to be equal.

16. The system as claimed in claim 15, wherein said unit control means includes override means responsive to the condition where the total power demanded of all of said generating units exceeds the power generated by said plurality of generating units at said economic condition, to cause said unit control means to increase the power generation of selected generating units.

17. The system as claimed in claim 14, wherein said unit control means further includes means for calculating the instantaneous power generating error for one of said generating units for the interval n as a function of the difference of the power demanded of said one generating unit and the actual power generated by said one generating unit modified by a factor K indicative of the power generating gain of that generating unit.

18. The system as claimed in claim 17, wherein said unit control means includes means for providing a representation of the weighted average of the power generating error of said one generating unit for the interval n as a function of the sum of the weighted average power generating error for said one generating unit for the previous interval ($n - T_S$), and the product of $T_S$ and the time rate of change of the power generating error for said one generating unit for the previous interval ($n - T_S$), and as a function of the instantaneous power generating error for said one generating unit for the interval n, said aforementioned values being modified by weighting coefficients selected to critically damp the power generation of the given system and to minimize noise.

19. The system as claimed in claim 18, wherein said unit control means includes means for providing a representation of the time rate of change of the power generating error for said one generating unit for the interval n as a function of the time rate of change of the power generating error for said one generating unit for the previous interval ($n - T_S$) and as a function of the difference between the instantaneous power generating error for said one unit for the interval n and the weighted average of the power generating error for said one generating unit for the previous interval ($n - T_S$), said aforementioned representation being modified by coefficients selected to damp critically the power generation of the given system and to minimize noise.

20. The system as claimed in claim 19, wherein said unit control means provides a representation of the anticipated power generating error for said one generating unit as a function of the sum of the weighted average power generating error for said one generating unit for the interval n and the product of the time rate of change of the power generating error for said one generating unit for the interval n and the interval $T_P$.

21. The system as claimed in claim 20, wherein there is further included storage means for storing and providing the weighted average system power generating error for the preceding interval ($n - T_S$), the time rate of change of the system power generating error for the preceding interval ($n - T_S$) the weighted average of the power generating error for each of said generating units for the preceding interval ($n - T_S$) and the time rate of change of the power generating error for each of said generating units for the preceding interval ($n - T_S$).

22. The system as claimed in claim 21 wherein said storage means further stores and provides representations of the factor $K_S$, the weighting coefficients, and the factors K for each of said generating units.

23. The system as claimed in claim 19, wherein there is included storage means for storing and providing representations of the rate limits of power generation for each of said plurality of generating units, and comparison means for comparing the same rate of change of the power generating error for one of said generating units for the interval n with the rate limit for said one generating unit as provided by said storage means, for preventing said control unit means from effecting a greater rate of power generation change from said one generating unit than its rate limit.

24. The system as claimed in claim 12, wherein there is further included storage means for storing and providing representations of the weighted average system power generating error for the preceding interval ($n - T_S$) and the time rate of change of the system power generating error for the previous interval ($n - T_S$).

25. A system for controlling the power generation of a given power system in accordance with a scheduled frequency, the given system including a plurality of generating units, and means for monitoring the frequency deviation of the power generated by the given system with respect to the scheduled frequency and the power generated by each of the plurality of generating units, said control system comprising:

a. instantaneous error detecting means responsive to the representation of frequency deviation from the scheduled frequency for providing a representation of instantaneous system area-control error;
b. calculation means for smoothing and weighting the representation of instantaneous system area-control error to provide an anticipated system power generating error; and
c. unit control means for controlling each of the power generating units as a function of the anticipated system power generating error.

26. A control process for controlling a given power system having a plurality of power generating units and at least one tie-line therefrom to a neighboring power system, said control process comprising the steps of:
 a. measuring representations of the tie-line power, the frequency deviation of the power generated by the given power system with respect to a scheduled frequency and the power generated by each of the plurality of generating units;
 b. calculating the instantaneous system area-control error as a function of the tie-line power, a schedule of power interchange with the neighboring systems and the frequency deviation;
 c. smoothing and weighting a representation of instantaneous system area-control error to provide an anticipated system power generating error, said steps of calculating, and smoothing and weighting being carried out in a digital computer; and
 d. applying control signals to each of the generating units as a function of the anticipated system power generating error.

27. The control process as claimed in claim 26, wherein the step of determining in accordance with paragraph (a) includes the sampling for intervals of time $n$, $(n - T_S)$, $(n - 2T_S)$ of the tie-line power, the frequency deviation of the given system and the power generated by each of the generating units, where $T_S$ is a sampling interval.

28. The control process as claimed in claim 26, wherein the step in accordance with paragraph (b) includes the calculation of the instantaneous system area-control error $E_A(n)$ in accordance with the following equation:
$$E_A(n) = \Sigma P_{Ti}(n) - P_S(n) + B\Delta F(n)$$
where $B$ is the power variation per unit deviation in frequency of the given system.

29. The control process as claimed in claim 28, further including the step of:
 determining the power $P_{NCi}(n)$ required by non-conforming loads associated with the given system, and said step of calculating the instantaneous system area-control error $E_A(n)$ further includes a factor indicative of the anticipated sum of the required power of all the non-conforming loads $\Sigma P_{NCi}(n)$.

30. The control process as claimed in claim 28, wherein the step of smoothing and weighting in accordance with paragraph (c) includes the steps of:
 summing the power demanded of all of the generating units for the computer solution interval $n$ to provide a value $\Sigma P_D(n)$;
 summing the power generated by all of the generating units for the computer solution interval $n$ to provide a value $\Sigma P_A(n)$; and
 calculating a first intermediate error $E_I(n)$ in accordance with the following formula:
$$E_I(n) = E_A(n) - \Sigma P_A(n) + \Sigma P_D(n)$$

31. The control process as claimed in claim 30, wherein the step of smoothing and weighting in accordance with paragraph (c) further includes:
 the storing and providing of the value $E_O(n - T_S)$ indicative of a second intermediate error for the previous interval $(n - T_S)$, and
 the calculation of a second intermediate error $E_O(n)$ for the computer solution interval $n$ in accordance with the equation:
$$E_O(n) = K_S E_I(n) + E_O(n - T_S)$$
where $K_S$ is indicative of the overall power gain of the given system.

32. The control process as claimed in claim 31, wherein the step of smoothing and weighting in accordance with paragraph (c) further includes:
 the storing and providing the representations of the weighted system power generating error $\overline{E_S(n - T_S)}$ for the previous interval $(n - T_S)$, and the time rate of change of the system power generating error $\overline{\dot{E}_S(n - T_S)}$ for the previous interval $(n - T_S)$; and
 the calculation of the weighted average system power generating error $\overline{E_S(n)}$ for the computer solution interval $n$ in accordance with the following formula:
$$\overline{E_S(n)} = (1 - \alpha)[\overline{E_S(n - T_S)} + T_S\overline{\dot{E}_S(n - T_S)}] + \alpha E_O(n)$$
where $\alpha$ is a weighting coefficient.

33. The control process as claimed in claim 32, wherein the step of smoothing and weighting in accordance with paragraph (c) further includes:
 the calculation of the time rate of change of the system power generating error $\overline{\dot{E}_S(n)}$ for the computer solution interval $n$ in accordance with the following equation:
$$\overline{\dot{E}_S(n)} = (1-\beta)\overline{\dot{E}_S(n-T_S)} + \frac{\beta}{T_S}[E_O(n) - \overline{E_S(n-T_S)}]$$
where $\beta$ is a weighting coefficient.

34. The control process as claimed in claim 33, wherein the step of smoothing and weighting in accordance with paragraph (c) further includes:
 the calculation of the values of $\alpha$ and $\beta$ to critically damp the power generation of the given system in accordance with the following equation
$$4\beta - \alpha^2 - \beta^2 - 2\alpha\beta = 0.$$

35. The control process as claimed in claim 34, wherein the step of smoothing and weighting in accordance with paragraph (c) further includes:
 the calculation of the values of $\alpha$ and $\beta$ to provide minimum system noise in accordance with the following equation:
$$\frac{2\alpha^2 + \alpha\beta + \beta^2}{\alpha(4 - \beta - 2\alpha)} = 1.$$

36. The control process as claimed in claim 35, wherein the step of smoothing and weighting in accordance with paragraph (c) further includes:
 the calculation of the anticipated system power generating error $\hat{E}_S(n + T_P)$ for the interval $(n + T_P)$ in accordance with the following equation:
$$\hat{E}_S(n + T_P) = \overline{E_S(n)} + T_P\overline{\dot{E}_S(n)}$$

37. The control process as claimed in claim 26, wherein the step of controlling each generating unit in accordance with paragraph (d) further includes:

providing a representation of the base powers $B_i(n)$ for all of the generating units for the computer solution interval $n$;

providing a representation of the percentages (%) participation of all of the generating units to meet the demanded incremental change of power in the interval $(n + T_P)$; and calculating the power $P_{Di}(n)$ required of each of the plurality of generators for the computer solution interval n in accordance with the following equation:
$$P_{Di}(n) = \hat{E}_s(n + T_P)(\%)_i + \text{Base}_i(n)$$

38. The control process as claimed in claim 37, wherein the step of controlling each generating unit in accordance with paragraph (d) further includes:

the computation of the $\text{Base}_i(n)$ for each of the plurality of generating units in accordance with an economic dispatch program to achieve an economic condition wherein the incremental power generating cost of each of the generating units is approximately equal.

39. The control process as claimed in claim 37, wherein the step of controlling each generating unit in accordance with paragraph (d) further includes:

providing a representation of power generated $P_A(n)$ for each of the generating units for the computer solution interval $n$; and the calculation of the instantaneous error $E(n)$ of each generating unit for the computer solution interval n in accordance with the following equation:
$$E(n) = K[P_D(n) - P_A(n)]$$
where $K$ is indicative of the gain of the generating unit regulating loop.

40. The control process as claimed in claim 39, wherein the step of controlling the generating units in accordance with the paragraph (d) further includes:

the storing and providing of representations indicative of the weighted average power generating error $\overline{E_Q}(n - T_S)$ for each generating unit for the previous interval $(n - T_S)$ and the time rate of change of the power generating error $\overline{\dot{E}_Q(n - T_S)}$ for the previous interval $(n - T_S)$; and the calculation of the weighted average power generating error $\overline{E_Q(n)}$ of each generating unit for the computer solution interval n in accordance with the following equation:
$$\overline{E_Q(n)} = (1 - \alpha)[\overline{E_Q(n - T_S)} + T_S\overline{\dot{E}_Q(n - T_S)}] + \alpha E(n)$$
where $\alpha$ is a weighting coefficient.

41. The control process as claimed in claim 40, wherein the step of controlling the generating units in accordance with the paragraph (d) further includes:

the calculation of the time rate of change of the power generating error $\overline{\dot{E}_Q(n)}$ of each generating unit for the computer solution interval n in accordance with the following equation:

$$\overline{\dot{E}_Q(n)} = (1-\beta)\overline{\dot{E}_Q(n-T_S)} + \frac{\beta}{T_S}[E(n) - \overline{E_Q(n-T_S)}]$$

where $\beta$ is a weighting coefficient.

42. The control process as claimed in claim 41, wherein the weighting coefficients $\alpha$ and $\beta$ are calculated to solve the following equations:

$$4\beta - \alpha^2 - \beta^2 - 2\alpha\beta = 0$$

$$\frac{2\alpha^2 + \alpha\beta + \beta^2}{\alpha(4 - \beta - 2\alpha)} = 1$$

to thereby critically damp the generation of power by the given system and to minimize system noise.

43. The control process as claimed in claim 41, wherein the step of controlling the generating units in accordance with paragraph (d) is effected to compensate for anticipated power generating error $\hat{E}_Q$ $(n + T_P)$ for the interval $(n + T_P)$ in accordance with the following equation:

$$\hat{E}_Q(n + T_P) = \overline{E_Q(n)} + T_P\overline{\dot{E}_Q(n)}$$

where $T_P$ is an anticipatory interval.

44. The control process as claimed in claim 43, wherein the anticipatory interval $T_P$ is greater than the sampling interval $T_S$.

45. The control process as claimed in claim 41, wherein the step of controlling the generating units in accordance with paragraph (d) further includes:

providing a representation of the rate limit of change of power generation change for each generating unit; and comparing the time rate of change of the power generating error $\overline{\dot{E}_Q(n)}$ for each generating unit with the predetermined rate limit to prevent the change of the time rate of the power generation of a unit generator from exceeding its rate limit.

46. The control process as claimed in claim 26 wherein the step of controlling the power generation of each generating unit in accordance with paragraph (d) includes the step of selecting a combination of the plurality of generating units to achieve the most economic power generation to meet the anticipated system power generating error in accordance with a unit commitment program, said unit commitment program including the steps of:

determining the possible combination of generating units for the nth interval $T_n$, where T is a predetermined interval;

determining the production cost for the interval $T_n$ for every combination of generating units in the interval $T_n$;

determining the combination of generating units employed in the previous interval $T_{n-1}$, and calculating the start-up cost of the additional generating units required for the combination in the present interval $T_n$;

determining the combination of generating units for the interval $T_{n-1}$ which minimizes the system cost of generating power from the first interval $T_1$ to the combination of power generating units in the present interval $T_n$ and storing this determined combination and its power generating cost; and determining the most economical combination of generating units in each interval T and the power generating cost for each interval T.

47. The control process as claimed in claim 46, wherein an economic dispatch program includes the step of determining the most economical settings of $\text{Base}_i(n)$ and percentage (%) for each generating unit.

48. A system for controlling the power generation of a given power system in accordance with a schedule of power interchange with a neighboring power system which is $P_S(n)$ for the interval $n$, the given system including a plurality of generating units, at least one tie-line to the neighboring power system, and means for measuring and providing representations of the tie-line power $P_{Ti}(n)$ for the interval n, the frequency deviation $\Delta F$ of the power generated by the given system with respect to a scheduled frequency, and the power $P_{Ai}(n)$ generated by each of the plurality of units for the interval $n$, said system comprising:

a. instantaneous error detecting means responsive to the representations of tie-line power $P_{Ti}(n)$, of the scheduled power interchange $P_S(n)$ and of frequency deviation $\Delta F$ for providing a representation of the instantaneous system area-control error $E_A(n)$ in accordance with the following equation:

$$E_A(n) = \Sigma P_{Ti}(n) - P_S(n) + B\Delta F(n)$$

where $B$ is a factor indicative of the system power variation per unit deviation in frequency;

b. calculation means for smoothing and weighting the representation of instantaneous system area-control error to provide an anticipated system power generating error $\hat{E}_S(n + T_P)$ for the interval $(n + T_P)$, said error detecting and calculation means including a digital computer; and c. unit control means for applying control signals to each of the generating units as a function of the anticipated system power generating error $\hat{E}_S(n + T_P)$.

49. The system as claimed in claim 48, wherein there is further included scanning means associated with the measuring means, for scanning sequentially the representations of tie-line power $P_{Ti}(n)$ and the frequency deviation of the given system whereby the instantaneous values of these representations are averaged over a sampling interval $T_S$.

50. The system as claimed in claim 48, wherein there is further included scanning means associated with the measuring means, for multiplexing the representations of tie-line power and frequency deviation whereby the effect of short-term variations of these representations upon the power generation of the given system is minimized.

51. The system as claimed in claim 48, wherein said calculation means further includes:

means for providing a representation of the power $P_{Di}(n)$ demanded for each generating unit for the interval $n$ and for providing a representation $\Sigma P_D(n)$ indicative of the sum of the demanded power of all of the generating units for the interval $n$;

means for providing a representation $\Sigma P_A(n)$ indicative of the sum of the power generated by all of the generating units for the interval $n$; and means for calculating a first intermediate error $E_I(n)$ in accordance with the following equation:

$$E_I(n) = E_A(n) - \Sigma P_A(n) + \Sigma P_D(n)$$

52. The system as claimed in claim 51, wherein said calculation means further includes:

means for storing and providing a representation of a second intermediate error $E_O(n - T_S)$ for the previous interval $(n - T_S)$, wherein $T_S$ is a sampling interval; and means for providing a representation of the second intermediate error $E_O(n)$ for the interval n in accordance with the following equation:

$$E_O(n) = K_S E_I(n) + E_O(n - T_S)$$

where $K_S$ is a power generating gain factor of the given system.

53. The system as claimed in claim 52, wherein said calculation means further includes:

storage means for storing and providing a representation of the weighted average system power generating error $\overline{E_S(n - T_S)}$ for the previous interval $(n - T_S)$ and the time rate of change of the system power generating error $\overline{\dot{E}_S(n - T_S)}$ for the previous interval $(n - T_S)$; and means for calculating the weighted average system power generating error $\overline{E_S(n)}$ for the interval n in accordance with the following equation:

$$\overline{E_S(n)} = (1 - \alpha)\,[\overline{E_S(n - T_S)} + T_S \overline{\dot{E}_S(n - T_S)}] + \alpha E_O(n)$$

where $\alpha$ is a weighting coefficient.

54. The system as claimed in claim 53, wherein said calculation means further includes:

means for calculating the time rate of change of the system power generating error $\overline{\dot{E}_S(n)}$ for the interval n in accordance with the following equation:

$$\overline{\dot{E}_S(n)} = (1 - \beta)\,\overline{\dot{E}_S(n - T_S)} + \frac{\beta}{T_S}[E_O(n) - \overline{E_S(n - T_S)}]$$

where $\beta$ is a weighting coefficient.

55. The system as claimed in claim 54, wherein said calculation means further includes:

means for calculating the anticipated system power generating error $\hat{E}_S(n + T_P)$ in accordance with the following equation:

$$\hat{E}_S(n + T_P) = \overline{E_S(n)} + T_P \overline{\dot{E}_S(n)}$$

where $T_P$ is an anticipatory interval.

56. The system as claimed in claim 55, wherein said calculation means further includes:

means for calculating the values of $\alpha$ and $\beta$ to solve the following equations:

$$4\beta - \alpha^2 - \beta^2 - 2\alpha\beta = 0$$

$$\frac{2\alpha^2 + \alpha\beta + \beta^2}{\alpha(4 - \beta - 2\alpha)} = 1$$

to critically damper the power generation of this system and to minimize system noise.

57. The system as claimed in claim 55, wherein said unit control means further includes:

means for storing and providing representations of the desired power generating output $\text{Base}_i$ for each generating unit and of the percentage (%) of participation of each of the generating units in a demanded incremental change of system power; and means for calculating the power demanded of each generating unit for the interval n in accordance with the following equation:

$$P_{Di}(n) = \hat{E}_S(n + T_P)\,(\%)_i + \text{Base}_i(n)$$

58. The system as claimed in claim 57, wherein said unit control means further includes:

means for calculating in accordance with an economic dispatch program values of $\text{Base}_i(n)$ for each of the generating units such that the incremental cost of power generation of each generating unit is approximately equal.

59. The system as claimed in claim 57, wherein the plurality of generating units is disposed within a network interconnecting the plurality of generating units to a load, said unit control means further including:

means for calculating values of base power output $\text{Base}_i(n)$ for each generating unit in accordance with a set of penalty factors indicative of the power loss due to its transmission from one of the generating units through a portion of the interconnecting network to the load.

60. The system as claimed in claim 57, wherein said unit control means further includes:

means for calculating an instantaneous error $E(n)$ for each generating unit for the interval n in accordance with the following equation:

$$E(n) = K[P_D(n) - P_A(n)]$$

where $K$ is a factor indicative of the power generation gain of that generating unit.

61. The system as claimed in claim 60, wherein said unit control means further includes:
storage means for storing and providing representations of the weighted average power generating error $\overline{E_Q}(n - T_S)$ of each generating unit for the previous interval $(n - T_S)$, and the time rate of change of the power generating error $\overline{\dot{E}_Q}(n - T_S)$ of each generating unit for the previous interval $(n - T_S)$; and means for calculating the weighted average power generating error $\overline{E_Q(n)}$ of each generating unit for the interval n in accordance with the following equation:

$$\overline{E_Q(n)} = (1 - \alpha)[\overline{E_Q(n - T_S)} + T_S\overline{\dot{E}_Q(n - T_S)}] + \alpha E(n)$$

where $\alpha$ is a weighting coefficient.

62. The system as claimed in claim 61, wherein said unit control means further includes:
means for calculating the time rate of change of the power generating error $\overline{\dot{E}_Q(n)}$ of each generating unit for the interval $n$ in accordance with the following equation:

$$\overline{\dot{E}_Q(n)} = (1-\beta)\overline{\dot{E}_Q(n-T_S)} + \frac{\beta}{T_S}[E(n) - \overline{E_Q(n-T_S)}]$$

where $\beta$ is a weighting coefficient.

63. The system as claimed in claim 62, wherein said unit control means further includes:
means for calculating the anticipated system power generating error $\hat{E}_Q(n + T_P)$ of each generating unit for the interval $(n + T_P)$ in accordance with the following equation:

$$\hat{E}_Q(n + T_P) = \overline{E_Q(n)} + T_P\overline{\dot{E}_Q(n)}$$

where $T_P$ is an anticipatory interval.

64. The system as claimed in claim 63, wherein there is included alarm means responsive to the anticipated system power generating error $\hat{E}_S(n + T_P)$ and the anticipated power generating error $\hat{E}_Q(n + T_P)$ of each generating unit to provide an alarm signal indicative of the condition where the power generating reserve of the given system is inadequate to meet the anticipated power demands on the given system and/or on one or more of the generating units.

65. The system as claimed in claim 63, wherein the anticipatory interval $T_P$ is greater than the sampling interval $T_S$.

66. The system as claimed in claim 63, wherein said unit control means includes:
means for storing and providing representations of the permissible loading and unloading rates of each of the generating units; and
comparison means for comparing for each generating unit its anticipated power generating error $\hat{E}_Q(n + T_P)$ and the stored values of its loading and unloading rates to prevent said unit control means from loading or unloading a generating unit at a rate greater than its permissible loading and unloading rates.

67. The system as claimed in claim 62, wherein said unit control means further includes:
storage means for storing and providing representations of the rate limit of change of power generation of each of the generating units;
comparison means for comparing the calculated time rate of change of power generation $\overline{\dot{E}_Q(n)}$ of each generating unit for the interval n with the stored rate limit for each generating unit, to prevent said unit control means from causing a rate change of power of a generating unit greater than its rate limit.

* * * * *